United States Patent
Ling (10) Patent No.: US 8,362,636 B2
(45) Date of Patent: Jan. 29, 2013

(54) PORTABLE 350 AIRPOWER MODULE

(76) Inventor: Kenge S Ling, Orange, CA (US)

( * ) Notice: Subject to any disclaimer, the term of this patent is extended or adjusted under 35 U.S.C. 154(b) by 362 days.

(21) Appl. No.: 12/803,360

(22) Filed: Jun. 25, 2010

(65) Prior Publication Data

US 2011/0198856 A1 Aug. 18, 2011

Related U.S. Application Data (60) Provisional application No. 61/338,253, filed on Feb. 16, 2010.

(51) Int. Cl.
*F03D 9/00* (2006.01)
*H02P 9/04* (2006.01)

(52) U.S. Cl. ......................................................... 290/55
(58) Field of Classification Search .................... 290/44, 290/55
See application file for complete search history.

(56) References Cited

U.S. PATENT DOCUMENTS

| | | | | |
|---|---|---|---|---|
| 6,838,782 B2* | 1/2005 | Vu | | 290/55 |
| 6,857,492 B1* | 2/2005 | Liskey et al. | | 180/165 |
| 6,897,575 B1* | 5/2005 | Yu | | 290/44 |
| 7,135,786 B1* | 11/2006 | Deets | | 290/55 |
| 7,176,584 B1* | 2/2007 | Green | | 290/55 |
| 7,211,905 B1* | 5/2007 | McDavid, Jr. | | 180/65.31 |
| 7,294,939 B1* | 11/2007 | Chen | | 290/55 |
| 7,339,286 B1* | 3/2008 | Chen | | 290/55 |
| 7,358,623 B2* | 4/2008 | Richards et al. | | 290/55 |
| 2005/0046195 A1* | 3/2005 | Kousoulis | | 290/44 |

* cited by examiner

*Primary Examiner* — Javaid Nasri
(74) *Attorney, Agent, or Firm* — John K. Buche; Buche & Associates, P.C.

(57) ABSTRACT

Disclosed may be an apparatus and related methods for electric power generation for vehicles. More particularly, disclosed may be an apparatus and related methods for electric power generation using vehicle generated wind. In one embodiment, the apparatus is a device for capturing the energy of wind around a moving auto body, the apparatus including a turbine that rotates when impacted by air moving relative thereto, an electricity generator with an armature shaft that rotates with the rotation of the turbine, an electrical outlet from the generator, and a non-cubical housing. In another embodiment the apparatus may be positioned on the top of a motor vehicle so that wind produced relative to the motion of the vehicle can turn the turbine to produce electricity.

20 Claims, 5 Drawing Sheets

CUT-IN-- The minimum vehicle speed at which the turbine will turn
CUT-OUT-- The maximum speed at which the turbine is shut down for safety
MPH = Vehicle Speed at Miles Per Hour

*FIG. 8*

PORTABLE 350 AIRPOWER MODULE

CROSS-REFERENCE TO RELATED APPLICATIONS

This application claims the benefit of U.S. Prov. Pat. App. Ser. No. 61/338,253 (filed Feb. 16, 2010) and said document is hereby incorporated by reference.

STATEMENT REGARDING FEDERALLY SPONSORED RESEARCH OR DEVELOPMENT

N/A

BACKGROUND OF THE INVENTION

1. Field of the Invention

The present disclosure relates to electric power generation for vehicles. More particularly, the present disclosure relates to wind turbines mounted on the roof top of a moving vehicle for converting the vehicle generated wind energy into electricity for storage in a battery system or use by the vehicle.

2. Background of the Invention

Moving automobiles feature localized winds around the auto body that are the result the car's movement relative to the air. Said localized winds possess energy that is lost whenever the wind dissipates. Accordingly, there is a need for apparatus and methods of capturing the energy of the localized wind prior to its dissipation.

Wind energy can be captured via its conversion to electricity. Producing electricity from wind can be accomplished by impacting the blades of a turbine with wind to turn the armature shaft of an electricity generator. For example, turbines and generators have been mounted on towers in areas known to have high winds so that the winds can turn the turbines and thereby produce electricity. One challenge of using a turbine to capture the localized winds of an automobile for producing electricity is that the production of electricity from wind impacting a turbine can be affected by the quantity and quality of the wind. For instance, a specific amount of wind must be received by a turbine at, or above, a specific velocity to overcome the friction associated with turning the turbine. Thus, wind turbines are (1) usually very large (e.g., blade or rotor diameter in the range of 100 ft. to 150 ft.) to capture a large quantity of wind at once, or (2) placed on towers in order to catch the high velocity winds which travel at high altitudes. The turbine size and high altitude placement present challenges in terms of capturing the energy of localized winds around a moving auto body.

Despite the above challenges, interest in producing electricity from localized wind around an auto body remains since the captured energy could be used as a power source for the moving automobile whereby its fuel efficiency or battery life is increased. Such electricity production is particularly of interest in the United States since the U.S. government has requested that the automobile industry produce more fuel efficient plug-in hybrid electric vehicles (PHEV) that can either partly or completely run on electric battery with zero emission in order to reduce greenhouse emissions and dependence on imported fossil fuels. Thus, many have tried to provide electric power to hybrid electric cars or trucks from a wind turbine. Consider the following examples: U.S. Pat. No. 6,897,575 B1, "Portable Wind Power Apparatus For Electric Vehicles" issued May 24, 2005, illustrates a car top wind generator; U.S. Pat. No. 6,857,492 B1, "Airflow Driven Electrical Generator For Moving Vehicle" issued Feb. 22, 2005, describes air intake vents mounted on the front grill and roof top of a moving vehicle for generating the electric power; U.S. Pat. No. 6,838,782 B2, "Wind Energy Capturing Device For Moving Vehicles" issued Jan. 4, 2005, describes a wind turbine affixed to the roof of truck. U.S. Pat. No. 7,135,786 B1, "Wind Driven Generator For Powered Vehicle" issued Nov. 14, 2006, describes a wind turbine affixed to the top of vehicle; U.S. Pat. No. 7,339,286 B1, "Portable Wind Power Generator" issued Mar. 4, 2008, describes a portable wind power capable of being placed in a storage case; U.S. Pat. No. 7,294,939 B1, "Folding Portable Wind-power Electricity Generating Apparatus" issued Nov. 13, 2007, describes a portable wind turbine generator at the top of car; U.S. Pat. No. 7,211,905 B1, "Vehicle-mountable Generator" issued May 1, 2007, describes a wind powered generator on top of a moving vehicle; U.S. Pat. No. 7,176,584 B1, "Wind Power Apparatus" issued Feb. 13, 2007, describes a wind powered turbine with generator to produce electricity; and, U.S. Pat. No. 7,358,623 B2, "Generator" describes a wind powered generator for producing electric current. All the above mentioned approaches to capturing localized winds about a moving auto body are inadequate because, among other things, they require wind capturing apparatus with complicated moving parts and housings. Accordingly, there is a need for portable devices for capturing the localized wind around a moving auto body that are simple and inexpensive.

SUMMARY OF THE INVENTION

The present disclosure may be a wind energy capturing device for a moving vehicle. The disclosed device may preferably be mounted on the body of the vehicle and feature a turbine coupled to a generator. Operably, movement of the vehicle relative to air will create high-speed winds that may impact the turbine blades and cause a turning force momentum or torque on the turbine shaft, which is directly connected to the generator's armature shaft. Suitably, said direct connection causes both of the wind turbine shaft and generator armature shaft to rotate concurrently (e.g., at the same R.P.M. (Revolution per Minute)). The electrical power resulting from the turning of said generator armature shaft may be used as a power source for the vehicle, be stored in a battery system for later use, be used to drive an electrical vehicle (EV), or be sold to a utility company.

It is the main object of the disclosure to provide a device for capturing wind energy when driving a vehicle on the highway.

It is another object of the disclosure to provide a method for employing vehicle-caused wind energy to rotate a PGM generator of a light weight and portable device for producing electricity.

It is further object of the disclosure to provide a device for inexpensively and renewably producing electricity from vehicle-caused wind in order to store the electricity or use it to drive a PHEV or EV vehicle.

It is another object of the disclosure to provide a device that can help reduce the levels of carbon dioxide emission in the atmosphere to 350 parts per million (PPM) in the coming years through reduced use of gas engines.

It is yet another object of the disclosure to provide a device for recharging EV batteries, without going to the public charge stations and sipping electricity from the power grid network on the road.

DESCRIPTION OF THE REFERENCED NUMERALS FROM THE DRAWINGS

The drawings and figures depict and describe aspects of an embodiment of the present disclosure. Within said drawings, the reference numerals identify the following items:

1 is a preferable galvanized metal roof with an elliptical body for improved aerodynamics;
2 is a preferable galvanized metal housing enclosure (the enclosure may be painted with green color or to match vehicle color);
3 is a preferable galvanized metal housing base;
4 is a preferable wind turbine with aluminum multi-blades;
5 is preferably an opening area in the housing 3 to allow air intake for turning the turbine with direct air impact;
6 are preferably metal grid bars to prevent flying objects, including birds and debris, from entering the opening 5;
7 is preferably a wind turbine shaft;
8 is preferably a rotated turbine strut support;
9 is preferably a ball bearing;
10 is preferably a fixedly positioned turbine truss;
11 is preferably a tubiform turbine support (preferably circular and metal), to which the truss 10 is fastened;
12 is preferably a generator with an armature shaft that is mechanically connected to the turbine shaft 7, wherein the generator 12 may be housed within the turbine support 11—(the generator 12 suitably converts the mechanical energy imparted to its armature shaft from the turbine shaft 7 into electrical energy at rotation speeds up to 3,000 RPM);
13 is suitably a protection plate for the top of the generator 12, wherein the protection plate 13 is fastened to the turbine truss 10;
14 is preferably a sitting seat cushion for stabilizing and insulating the generator 12;
15 is suitably a protection plate for the bottom of the generator 12, wherein the protection plate 13 may be fastened to the floor 3 of the housing 2;
16 are preferably output wires from the generator 12 (there are suitably depicted positive (+) and negative (−) wires);
17 is preferably a ball bearing at the bottom of the armature shaft of the generator 12;
18 are preferably a metal handle hook and a keyless lock on the housing 2 for security;
19 is preferably a bottom bracket for supporting the generator housing 11;
20 is suitably an access opening at the bottom of the housing 2 for air and heat exhaust;
21 are preferable metal grid bars and an access door;
22 are preferably drain holes (4 each) in the housing base 2;
23 is a preferable chassis ground—(e.g., a point connection in the electricity-generation circuit that is connected to the metal enclosure);
24 is a preferable power monitor that combines the function of the ammeter, volt meter, watt meter, amp hour and watt hour meters;
25 Voltage regulator (optional);
26 DC/AC inverter—the inverter is an electronic device that converts low voltage DC (direct current) electricity from a battery (12 volts) to 115 volts AC (alternating current) household power;
27 Serial number for security identification;
28 GPS alarm system (optional);
29 12 volts deep cycle battery banks;
30 Fastening hardware;

DETAILED DESCRIPTION OF THE INVENTION

In general, this application discloses a preferable vehicle-mountable wind energy capturing device for converting vehicle-created wind into electricity. The technical contents and detailed description of the preferable device will be made with reference to FIGS. 1 through 8.

Figure 1:
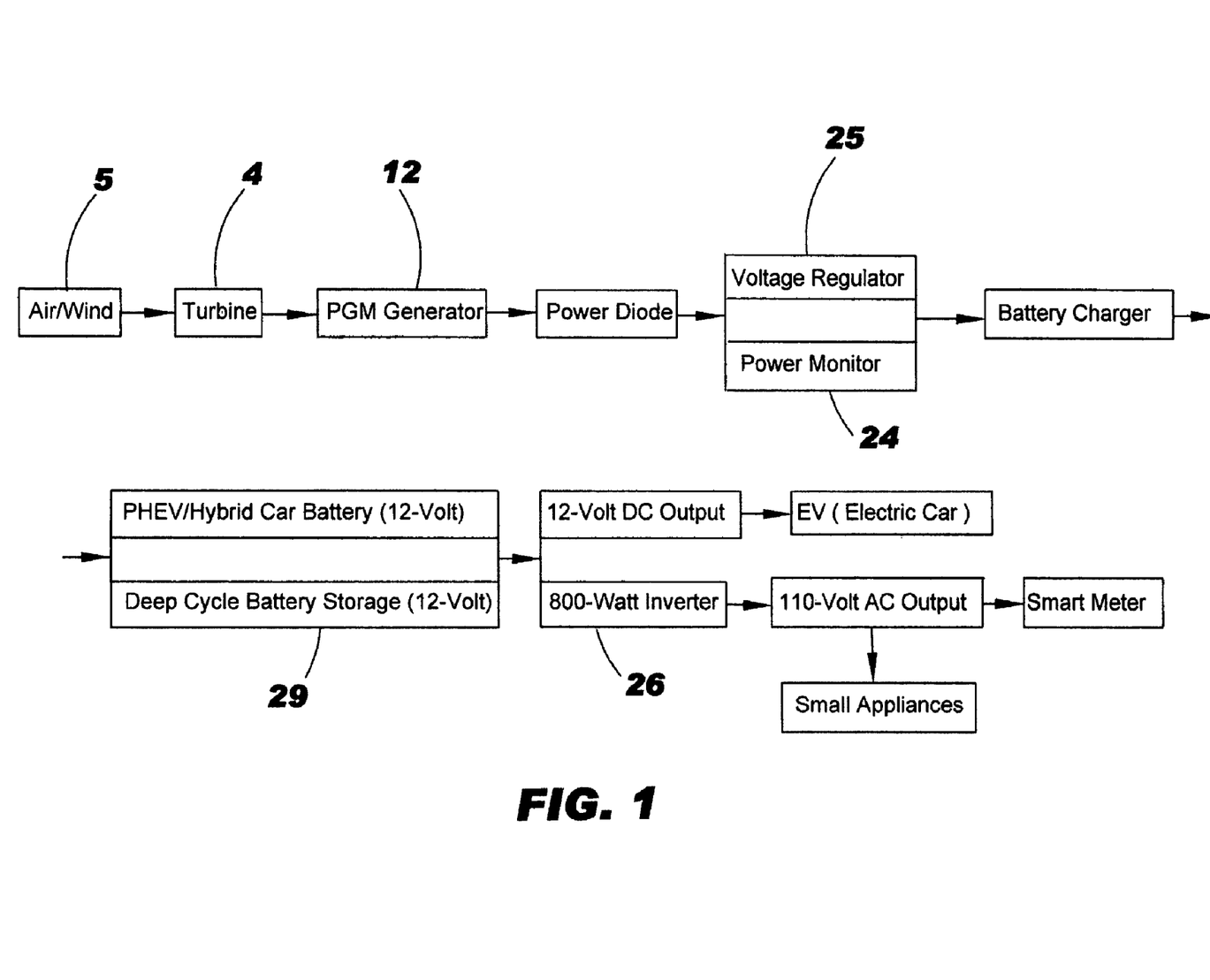
FIG. 1 is a block diagram for electricity generation using a wind energy capturing device disclosed by this application.
Figure 2:
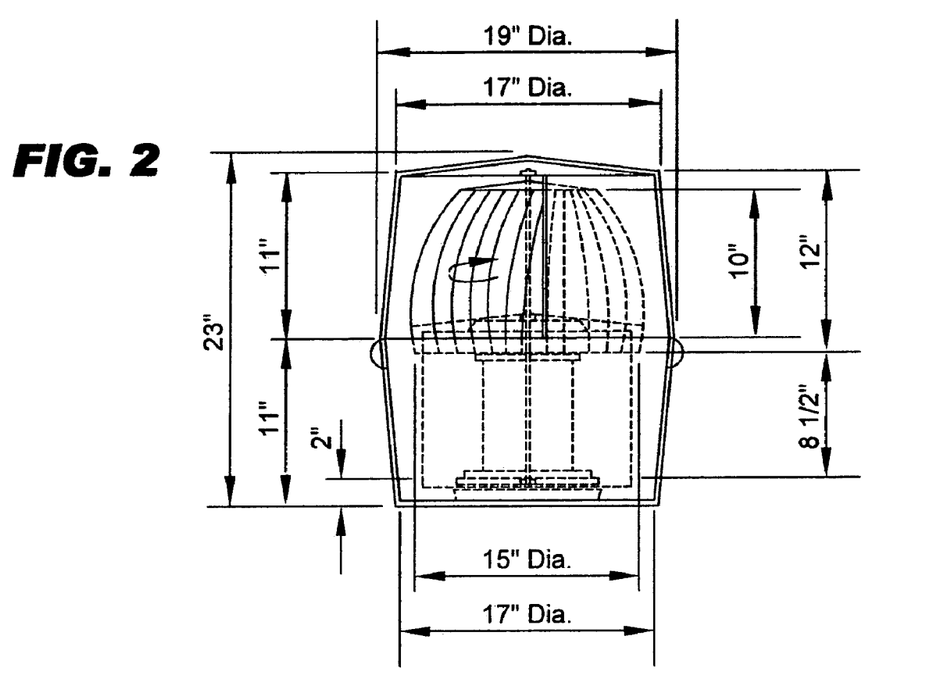
FIG. 2 is a front view showing the preferable external dimensions of a wind energy capturing device.
Figure 3:
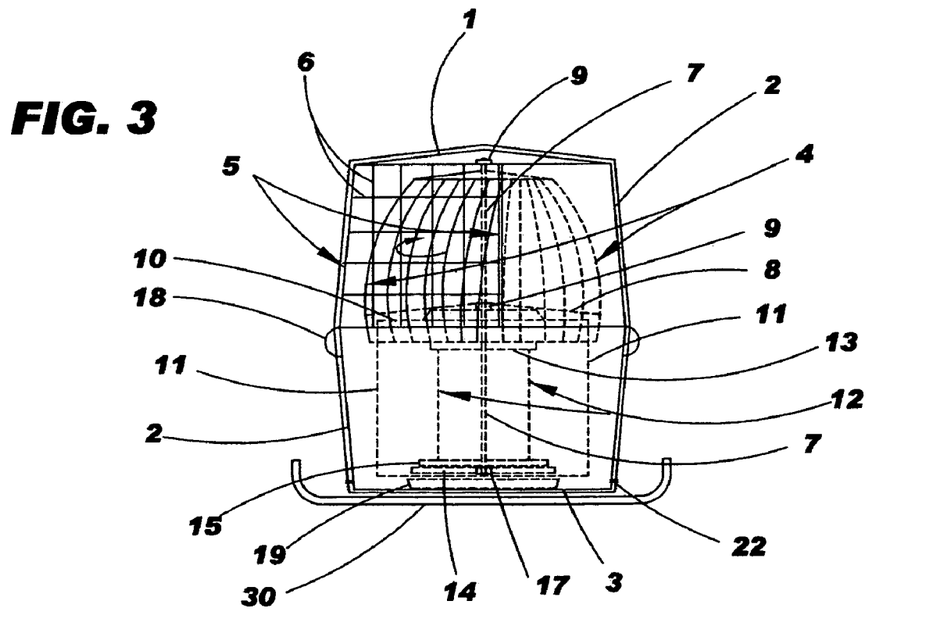
FIG. 3 is the front view of the wind energy capturing device.
Figure 4:
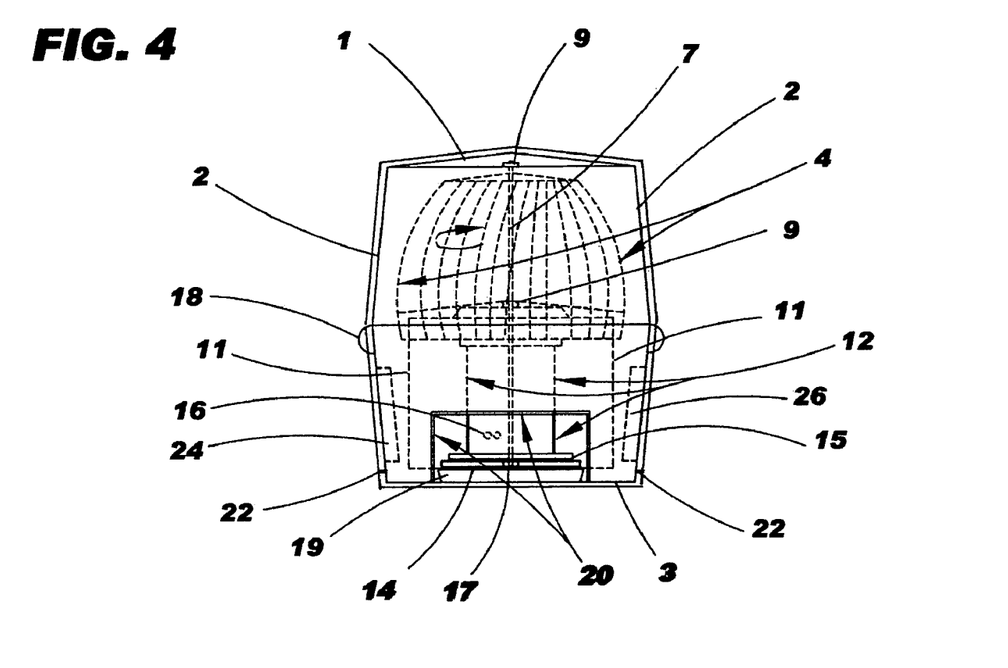
FIG. 4 is a back view of the wind energy capturing device of FIGS. 2 and 3

FIGS. 2 and 3 depict the front view of a preferable vehicle-mountable wind energy capturing device. FIG. 4 depicts the back view of the preferable vehicle-mountable wind-energy capturing device. As seen in FIGS. 2 through 4, the device generally comprises a housing 2, a turbine 4, and a generator 12. The more specific aspects of the general components are best disclosed with reference to FIGS. 1 through 4.

The features of a preferable housing 2 are best depicted in FIGS. 2, 3, and 4. As generally depicted in said figures, the housing 2 is preferably small and not cubical so that it may be more aerodynamic. Qualitatively, the housing 2: is generally cylindrical while preferably being pointed at its top and around its mid-section for improved aerodynamics, including drag minimization; features an opening 5 below its roof 2 and above its pointed mid-section; features drainage holes 22 in its base 3; and features a backside exhaust opening 20 above its base 3 but below its pointed mid-section. Quantitatively, the preferable housing 2 is dimensioned as follows: twenty-three inches in total height (i.e., from its base 3 to the point of its roof 1; twenty-two inches in crown height (i.e., from its base 3 to the start of the roof 1); eleven inches in height from its base to the pointed mid-section; seventeen inches in diameter at its base 3 and crown; and, nineteen inches in diameter at its pointed mid-section. Suitably, the opening 5 is preferably defined by a cut-away in the housing 2 side-wall for more than ninety, but less than three-hundred and sixty, degrees around the axis of the housing 2. Additionally, the exhaust opening 20 is preferably defined by a cut-away in the housing side-wall for less than three-hundred and sixty, degrees around the axis of the housing 2. Any number of preferable three-dimensional aerodynamic shapes and sizes could define the shape of the housing 2 and such shapes will be known to one of skill in the art.

The preferable turbine 4 and generator 12 are best depicted in FIGS. 2 and 3. As seen in the figures, the turbine 4 is preferably of the vertical axis variety which typically comprises a plurality of blades which radially extend from a shaft 7 that defines an axis of rotation for the turbine blades. The generator 12 is preferably of the PMG (permanent magnet generator) variety and features an armature shaft that is mechanically connected to the shaft 7 of the turbine 4. Operably, rotation of the turbine shaft 7 via wind impacting at least one of the turbine 4 blades correspondingly rotates the armature shaft of the generator 12 whereby electricity is suitably generated. Structurally, the turbine 4 and the generator 12 are preferably vertically situated as depicted in the drawings so that the turbine shaft 7 also defines the armature shaft of the generator 12. Suitably, the generator 12 features output electrical wires 16 so that the generated electricity may be extracted therefrom (e.g., positive and negative wires may be connected to the terminals of a 12 volt deep cycle battery 29 so that the battery may be recharged).

Still referring to FIGS. 2 and 3, the turbine 4 and generator 12 are preferably situated within the housing so that the central axis of the cylindrical housing 2 generally aligns with the turbine/armature shaft 7 and so that the turbine 4 blades are positioned behind the opening 5. Suitably, the shaft 7 is rotatably mounted on ball bearings (9 and 17) at the roof 1 and base 3 of the housing 2. Ideally, the turbine 4 is supported in said preferable position above the generator 12 and behind the opening 5 by a truss 10 inside the housing 2 (the truss 10 may preferably positioned about at the mid-section of the housing 2). In the depicted preferable embodiment, the truss 10 is supported at the housing midsection by a tubiform structure 11 wherein the truss 10 sets atop the tubiform 11 across its bore. Preferably the turbine 4 is affixed to the truss 10 via a strut 8. As also depicted in the drawings, the generator 12 is preferably positioned between protector plates (13 and 15) and on top of a cushion/insulator 14 beneath the truss 10 and within the tubiform 11. Suitably, the generator 12 is supported in its position by (1) attachment to the upper protection plate 13 and the truss 10, and (2) a bracket and its protector plate 15 that are secured to the base 3 of the housing 2.

Figure 5:
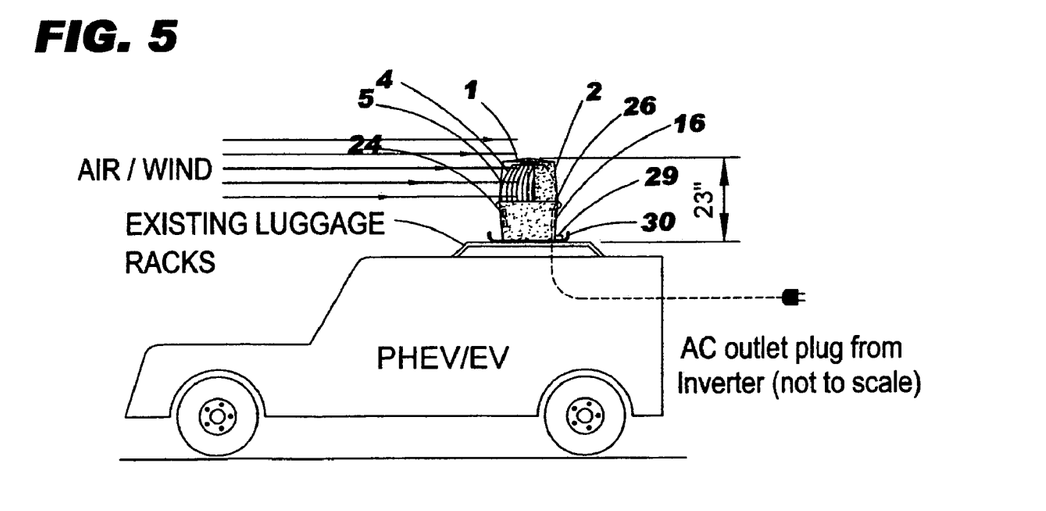
FIG. 5 is a side view of the wind energy capturing device of FIGS. 2 and 3 installed on a car.
Figure 6:
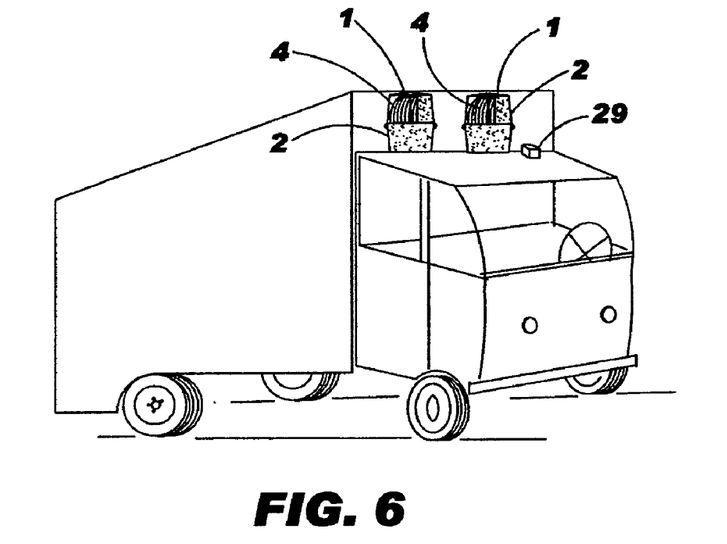
FIG. 6 is a perspective view showing the wind energy capturing device of FIGS. 2 and 3 installed on a truck cab or train.
Figure 7:
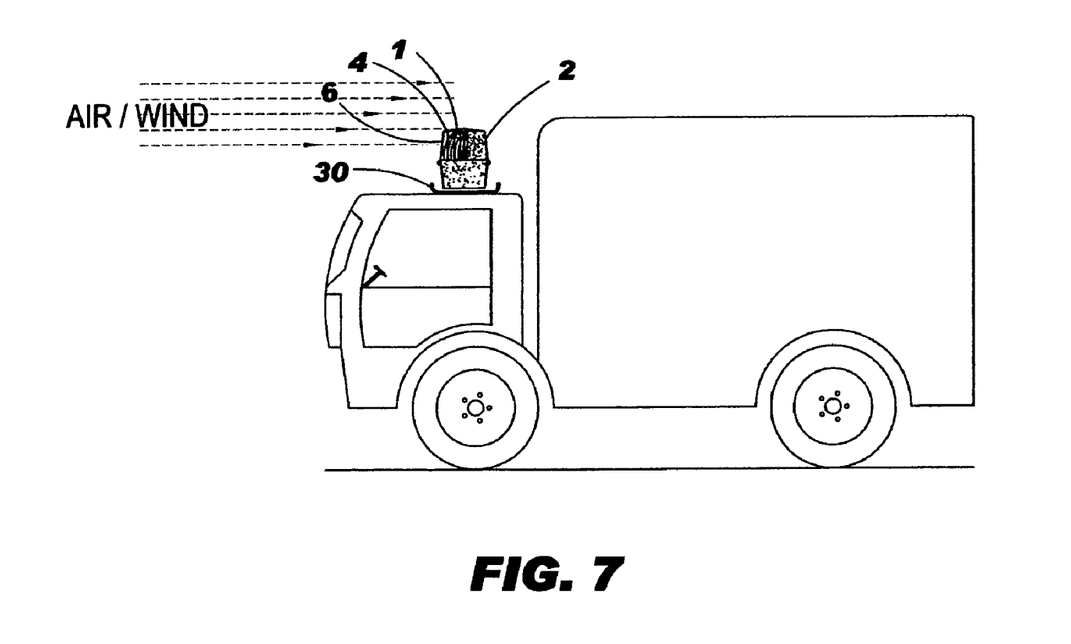
FIG. 7 is a typical side view of the truck and device.

FIGS. 5 through 7 are environmental or contextual views of the vehicle-mountable wind energy capturing device. More specifically, FIG. 5 shows the device mounted on the luggage rack of a car and FIGS. 6 and 7 show the device mounted on the cab of a truck. Operably, localized wind from the movement of the vehicle relative to air may pass through the opening 5, impact the blades of the turbine 4 so that the shaft 7 rotates, and escape the housing through the exhaust opening 20. It should be noted that a grid 6 of metal bars may be placed in front of the opening 5 in order to prevent flying objects, including birds or other debris, from passing into the wind intake opening 5 or impacting the turbine blades while continuing to permit air flow therethrough. As alluded to above, the wind caused rotation of the shaft 7 correspondingly produces electricity at the generator 12. Suitably, the generator 12 is configured to convert the mechanical energy of rotation into electrical energy at up to three-thousand revolutions per minute (RPMs).

It should be noted that, even though FIGS. 5 through 7 depict the vehicle-mountable wind energy capturing device installed on the luggage rack of a car or cab of a truck, the device is mountable at any wind exposed location on a vehicle. Furthermore, cars and trucks are not the only vehicles suitable for installation of the wind energy capturing device. Other suitable vehicles include, but should not be limited to, trains and boats. Finally, any number of wind-energy capturing devices may be placed on a car or truck.

Figure 8:
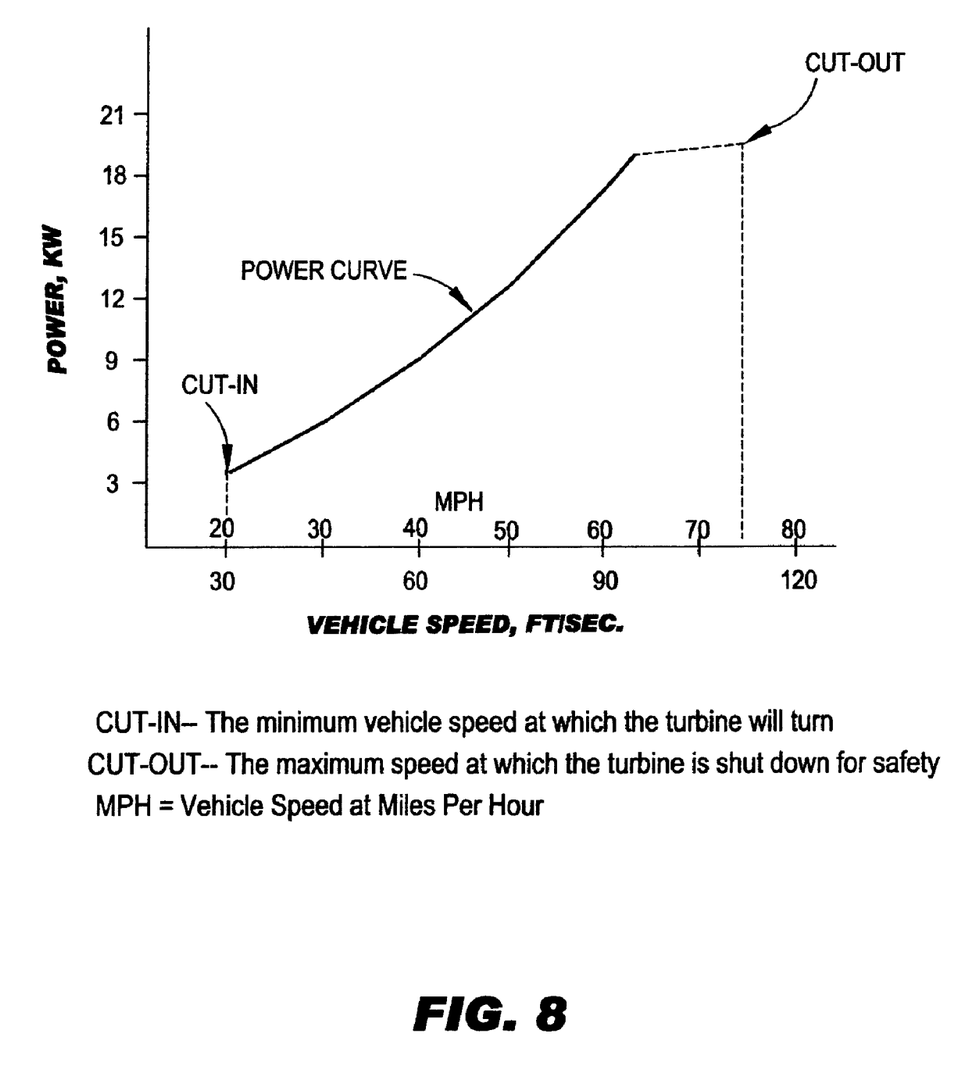
FIG. 8 is a line graph showing the relationship between the speed of vehicle (in mile per hour (MPH) and/or feet per second) versus amount of power produced.

FIG. 8 is an exemplary power produced versus vehicle speed plot. The depicted plot illustrates power capable of being produced by a preferable vehicle-mountable wind energy capturing device at a given vehicle speed. As seen in the figure, power is plotted in KW (kilowatt) on the vertical coordinate axis and vehicle speed is plotted in ft/sec (feet per second) or MPH (miles per hour) on the horizontal coordinate axis. As further seen in the figure, the subject vehicle-mountable wind energy capturing device may not produce power until the vehicle travels at a minimum speed, the Cut-In speed. Suitably, the Cut-in speed is the vehicle speed necessary to produce enough wind to turn the turbine blades of the wind energy capturing device. Suitably, the wind energy capturing device will shut down its turbine when the vehicle speed produces wind that turns the turbine at an unsafe rate, the Cut-Out speed. At vehicle speeds between the Cut-in and Cut-Out speeds, the wind energy capturing device is capable of producing power, the plot of which is identified in FIG. 8 as the power curve. Typically, the power curve can be expressed by $P=(6.28*f(v)*T(v))*E$, where: "P" is the power output of the wind energy capturing device; "f" is the turbine shaft 7 rotation (in hertz (divide by 60 for RPM)) as a function of vehicle velocity "v"; "T" is the torque (in Newton-meter (NM)) on the shaft 7 as a function of vehicle velocity "v" (bearing friction and windage on the commutator and ammeter may add significantly to the torque required to produce a specific amount of power); and "E" is the efficiency (in percent) of the energy generator 12. The efficiency of a PMG generator 12 can be influenced by several independent factors, so a single efficiency is not available. Instead, PMG generators 12 operate at a range of efficiencies between seventy-five percent and ninety-five percent, with the average efficiency being eighty five percent. Suitably, the preferable wind energy capturing device will produce 5 KW of power with a torque of 26.5 NM (19.5 lb. ft.).

FIG. 1 depicts a simple block diagram showing the steps of using the disclosed device for converting wind to electricity. First, wind may be received in the wind intake 5 of the housing 2. Second, the received wind may impact at least one blade of a turbine 4 to cause rotation of the turbine shaft 7. Third, the rotation of the turbine shaft 7 suitably results in rotation of the generator 12 armature shaft. The electricity generated by said rotation of the generator 12 armature shaft is provided through the power diode and voltage regulator 25 or power monitor 24 to a battery charger, preferably for recharging a PHEV or EV deep cycle battery 29. Suitably, a monitor with an audible alarm tracks the produced electricity and sounds before any damage to the system can occur during the electricity production or transfer process. Finally, the battery charger is electrically connected to an inverter 26 which will convert the DC electricity to an AC electricity output.

The preferable vehicle-mountable wind energy capturing device has efficiency increasing features, including but not limited to: a turbine 4 that shares a shaft 7 with a PMG generator 12 so that transmission losses are reduced; and lubricated bearings (9 and 17). Furthermore, the preferable embodiment may be comprised of materials that are light weight and durable, said materials being known to those of skill in the art. It is understood that the present invention is not limited to the embodiment described above, but can encompass any and all embodiment within the scope of the following claims.

I claim:

1. A device for capturing the energy of wind around a moving auto body comprising:

A vertical axis turbine with a plurality of blades which radially extend from a shaft that defines the vertical axis of rotation for the turbine, wherein the turbine rotates when impacted by air moving relative thereto;

an electricity generator with an armature shaft that is mechanically coupled to the shaft of the turbine so that the armature shaft rotates with the rotation of said turbine;

an electrical outlet from the generator;

a non-cubical housing that has a base, a roof, and a sidewall, is generally cylindrical with an axis that aligns generally with the shaft of the turbine and the armature shaft of the generator, wherein the housing is pointed at the roof to form a crown at an intersection of the roof and sidewalls and wherein the housing is pointed around a midsection of the sidewall, features an opening that is defined by a cutaway in the sidewall for more than ninety degrees but less than three-hundred and sixty degrees around the axis of the generally cylindrical housing, wherein the opening is located below the roof but above the midsection of the sidewall, features drainage holes in the base; and, wherein the turbine is supported inside the housing above the generator and behind the opening.

2. The device of claim 1, further comprising a power monitor that is electrically connected to said generator so as to generate desired electrical current.

3. The device of claim 2, further comprising a battery system that has at least one deep cycle battery electrically connected with said power monitor for storing generated electric power.

4. The device of claim 3, wherein the device is coupled to the body of a PHEV or EV and whereby the PHEV or EV may be electrically driven in part by the electric power stored in said battery system as generated by said generator.

5. The device of claim 4, wherein the battery system comprises a battery of the PHEV or EV so that said PHEV or EV can recharge its own battery for traveling at great distance before stopping at the public charge station.

6. The device of claim 1, wherein each of said turbine and said generator have a direct rotating shaft connection, whereby upon rotation of said turbine, electric power is generated by said generator.

7. The device of claim 1 wherein the housing is twenty three inches in total height (from the base to the point of the roof), twenty two inches in crown height (from the base to the crown), eleven inches between the base and the midsection, seventeen inches in diameter at the base and crown, and nineteen inches in diameter at the midsection of the sidewalls.

8. The device of claim 1:
wherein the housing is of galvanized metal and features the roof and the base;
wherein the turbine is aluminum and features the shaft;
wherein the opening in the housing features metal grid bars to prevent flying objects from passing therethrough; and,
wherein the generator features the armature shaft that is mechanically connected to the turbine so that the generator suitably converts mechanical energy imparted to its armature shaft from the turbine into electrical energy.

9. A device for collecting the energy of localized wind that is the result of moving an auto body with respect to air, said device comprising:
a housing with an opening that is configured for receiving said localized wind, wherein the housing
has a base, a roof, and a sidewall,
is generally cylindrical with an axis that aligns generally with a shaft of a turbine and an armature shaft of a generator, wherein the housing is pointed at the roof to form a crown at an intersection of the roof and sidewalls and wherein the housing is pointed around a midsection of the sidewall,
features an opening that is defined by a cutaway in the sidewall for more than ninety degrees but less than three-hundred and sixty degrees around the axis of the generally cylindrical housing, wherein the opening is located below the roof but above the midsection of the sidewall,
features drainage holes in the base;
wherein the turbine features at least one blade, wherein the turbine is positioned within the housing so that the blade(s) is impacted by said localized wind whenever said localized wind is received at the opening, and wherein the turbine rotates with any impact of said blade(s) with said localized wind;
wherein the electricity generator with armature shaft that rotates with the rotation of said turbine;
an electrical outlet from the generator; and,
wherein the turbine is supported inside the housing above the generator and behind the opening.

10. The device of claim 9 wherein the generator is a PMG generator.

11. The device of claim 10 wherein the turbine is a vertical axis turbine.

12. The device of claim 11 wherein the housing is twenty three inches in total height (from the base to the point of the roof), twenty two inches in crown height (from the base to the crown), eleven inches between the base and the midsection, seventeen inches in diameter at the base and crown, and nineteen inches in diameter at the midsection of the sidewalls.

13. The device of claim 10 wherein the housing is twenty three inches in total height (from the base to the point of the roof), twenty two inches in crown height (from the base to the crown), eleven inches between the base and the midsection, seventeen inches in diameter at the base and crown, and nineteen inches in diameter at the midsection of the sidewalls.

14. The device of claim 13 wherein the device is installed on the auto body.

15. The device of claim 14 wherein the auto body is the body of a PHEV or EV.

16. The device of claim 14 wherein the auto body is the body of a vehicle selected from the group consisting essentially of boat, car, bus, train, truck.

17. The device of claim 9 wherein the housing is twenty three inches in total height (from the base to the point of the roof), twenty two inches in crown height (from the base to the crown), eleven inches between the base and the midsection, seventeen inches in diameter at the base and crown, and nineteen inches in diameter at the midsection of the sidewalls.

18. The device of claim 9:
wherein the housing is of galvanized metal and features the roof and the base;
wherein the turbine is aluminum and features the shaft;
wherein the opening features metal grid bars to prevent flying objects from passing therethrough; and,
wherein the generator features the armature shaft that is mechanically connected to the turbine so that the generator suitably converts mechanical energy imparted to its armature shaft from the turbine into electrical energy.

19. A method of producing electricity comprising the steps of:
moving an auto body with respect to air to produce an impact between the air and a turbine blade;
rotating an armature shaft of a generator with a force of the impact between the air and the turbine blade;
outletting electricity from the generator;
wherein a turbine with the turbine blade on a shaft and the generator are located in a housing that
has a base, a roof, and a sidewall,
is generally cylindrical with an axis that aligns generally with the shaft of the turbine and the armature shaft of the generator, wherein the housing is pointed at the roof to form a crown at an intersection of the roof and sidwalls and wherein the housing is pointed around a midsection of the sidewall, features an opening that is defined by a cutaway in the sidewall for more than ninety degrees but less than three-hundred and sixty degrees around the axis of the generally cylindrical housing, wherein the opening is located below the roof but above the midsection of the sidewall, features drainage holes in the base; and, wherein the turbine is supported inside the housing above the generator and behind the opening.

20. The method of claim 19 wherein the housing is removably coupled to the auto body.

\* \* \* \* \*